(12) United States Patent
Lane

(10) Patent No.: US 7,142,091 B2
(45) Date of Patent: Nov. 28, 2006

(54) SELF-AUTHENTICATING IDENTIFICATION SUBSTRATE WITH ENCODED PACKET OUTPUT

(76) Inventor: William F. Lane, 4709-A St. Andrews Dr., Wilson, NC (US) 27896-9171

( * ) Notice: Subject to any disclaimer, the term of this patent is extended or adjusted under 35 U.S.C. 154(b) by 174 days.

(21) Appl. No.: 10/467,651

(22) PCT Filed: Feb. 11, 2002

(86) PCT No.: PCT/US02/03964

§ 371 (c)(1),
(2), (4) Date: Aug. 8, 2003

(87) PCT Pub. No.: WO02/065375

PCT Pub. Date: Aug. 22, 2002

(65) Prior Publication Data

US 2004/0061593 A1 Apr. 1, 2004

Related U.S. Application Data

(63) Continuation of application No. 09/780,637, filed on Feb. 9, 2001, now abandoned.

(51) Int. Cl.
*G06K 5/00* (2006.01)

(52) U.S. Cl. .................. 340/5.83; 340/5.28; 340/5.53; 235/380; 382/124

(58) Field of Classification Search .............. 340/5.83, 340/5.53, 5.65, 5.26, 5.28, 539.13; 382/116, 382/124; 235/380, 381, 382, 382.5, 492
See application file for complete search history.

(56) References Cited

U.S. PATENT DOCUMENTS

| | | | |
|---|---|---|---|
| 4,085,313 A | 4/1978 | Van Ness | |
| 4,614,861 A | 9/1986 | Pavlov | |
| 4,720,860 A * | 1/1988 | Weiss | 713/184 |
| 4,993,068 A | 2/1991 | Piosenka | |
| 5,053,608 A | 10/1991 | Senanayake | 340/5.83 |
| 5,180,901 A | 1/1993 | Hiramatsu | 340/583 |
| 5,280,527 A * | 1/1994 | Gullman et al. | 713/184 |
| 5,317,636 A * | 5/1994 | Vizcaino | 705/65 |
| 5,448,044 A | 9/1995 | Price et al. | 235/380 |
| 5,465,290 A | 11/1995 | Hampton et al. | |
| 5,623,552 A | 4/1997 | Lane | |
| 5,806,040 A | 9/1998 | Vensko | |
| 5,861,841 A * | 1/1999 | Gildea et al. | 342/357.12 |
| 5,897,616 A | 4/1999 | Kanevsky et al. | |
| 5,920,642 A | 7/1999 | Merjanian | 382/126 |
| 6,016,476 A | 1/2000 | Maes et al. | |
| 6,084,967 A | 7/2000 | Kennedy et al. | |
| 6,119,096 A | 9/2000 | Mann et al. | 705/5 |
| 6,125,192 A * | 9/2000 | Bjorn et al. | 382/124 |
| 6,208,264 B1 | 3/2001 | Bradney et al. | 382/115 |
| 6,213,391 B1 | 4/2001 | Lewis | 235/380 |
| 6,213,403 B1 | 4/2001 | Bates, III | 235/492 |
| 6,325,285 B1 * | 12/2001 | Baratelli | 235/380 |
| 6,547,130 B1 * | 4/2003 | Shen | 235/380 |
| 6,903,681 B1 * | 6/2005 | Faris et al. | 342/357.06 |
| 2002/0035542 A1 | 3/2002 | Turney et al. | 340/5.83 |
| 2002/0070844 A1 | 6/2002 | Davida et al. | 340/5.53 |

\* cited by examiner

*Primary Examiner*—Edwin C. Holloway, III
(74) *Attorney, Agent, or Firm*—MacCord Mason PLLC

(57) ABSTRACT

A biometric fingerprint device for self-authenticating identification of a user of the device including internal memory and processing within a substrate of the device and digitized tonal output for communicating with a remote tone bank for validation. The digitized tonal output further includes a unique transaction identifier for increased security, particularly with retail transactions made via phone, wireless device, Internet, satellite, or other communication networks.

4 Claims, No Drawings

SELF-AUTHENTICATING IDENTIFICATION SUBSTRATE WITH ENCODED PACKET OUTPUT

This application is a continuation of U.S. patent application Ser. No. 09/780,637 filed Feb. 9, 2001, now abandoned.

BACKGROUND OF THE INVENTION (1) Field of the Invention

The present invention relates generally to biometric identification devices and, more particularly, to a biometric fingerprint device for providing self-authentication of the identity of predetermined user(s).

(2) Description of the Prior Art

Prior art biometric devices commonly employ fingerprint identification and verification as a means for protecting the use of the device for proximity pass, apparatus activation, and access to information. Furthermore, it is known in the prior art to use portable information and transaction processing devices (PITP devices). These devices can be used to perform secure financial transactions, to allow the user access to another apparatus, or to transmit information for various personal reasons. To perform these functions, these devices are able to store data internally and transmit data, including personal user data, over communication lines. PITP devices may also employ biometric verification to ensure the identity of the user. In these devices, biometric verification may include finger, thumb, palm, and voice print, handwriting sample, retinal vascular pattern, and combinations thereof. Additionally, these devices have been constructed to include card readers that read information storage cards. Also, these devices can encrypt information and transmit it via dual-tone multi-frequency, modem, radio frequency, and infrared media. However, none of these devices are free-standing devices, in that they require an external central data storage and processing unit to verify the identity of the PITP device user. Additionally, because the data is stored on a central data storage unit, the security of these devices and information relating to their users may be eventually compromised. In such a case, unauthorized use of the PITP device may occur, allowing unauthorized transactions. A single device has overcome this deficiency by incorporating the storage means of the biometric information within the PITP device. Thus, the device is free-standing and will not emit a signal unless the appropriate user is using the device. However, this device does not also emit tonal signals to confirm authentication of the user via biometric identification means. Therefore, there remains a need for a self-authenticating biometric identification device that can be used in connection with an encoded packet output, e.g., a digitized tonal output also having capacity to be used with portable information and transaction processing devices. Particularly where privacy issues are a significant concern, it is advantageous to provide a biometric device within which the individual fingerprint and other data or information is stored, i.e., there is no requirement for transmitting the fingerprint itself to a remote confirmation bank or source that stores the registered information against which the sensed fingerprint is verified.

More particularly, the following U.S. patent citations provide a basis for establishing the prior art relevant to the present invention:

U.S. Pat. No. 6,016,476 issued Jan. 18, 2000 to Maes, et al. for Portable information and transaction processing system and method utilizing biometric authorization and digital certificate security. This patent teaches a portable client PDA with touch screen, microphone, and CPU for processing voice commands, and processing biometric data to verify user. Also it has memory for storing personal/financial data, and capability for reading/writing information to various smart cards, magnetic cards, etc.

U.S. Pat. No. 6,084,967 issued Jul. 4, 2000 to Kennedy, et al. for Radio telecommunication device and method of authenticating a user with a voice authentication token. The user must insert a PIN and utter sounds; the radiotelephone device will activate secure functions only if PIN is correct and uttered sounds are authenticated against stored voice feature information.

U.S. Pat. No. 5,465,290 issued Nov. 7, 1995 to Hampton, et al. for Confirming identity of telephone caller. Data stored in a processing station corresponds to a signature and caller identification information for users. A second processing station includes speaker verification unit and processor, which receives voice or tone signal representing signature of potential user and processes this. Processor is connected to speaker verification unit and connects to first processing station to test the signature of user against valid signature of user.

U.S. Pat. No. 5,897,616 issued Apr. 27, 1999 to Kanevsky, et al. for Apparatus and methods for speaker. Provides verification/identification/classification employing non-acoustic and/or acoustic models and databases. Secure method and apparatus for access to service facility employing voice recognition; based on personal information an individual is questioned, a voice sample is obtained and verified. A score is generated based in comparison to spoken answer and voice sample, and access is granted if score is at or above a threshold. Alternatively, a series of questions could be asked and potential matches to the speaker are eliminated after comparison of voice/response analysis.

U.S. Pat. No. 5,806,040 issued Sep. 8, 1998 to Vensko for Speech controlled telephone credit card verification system. The system connects user to phone network, user enters a card number, a voice verification template is retrieved and contains samples of user's voice stating selected words/phrases/numbers. The user is prompted to state one of these and comparison is made. User is authorized if match is made.

None of the previously issued patents cited in the foregoing provide a biometric device having internal memory and internal controller means while also providing a tonal output for authorizing transactions from the device via modern communication means.

Thus, there remains a need for a biometric identification device, specifically a self-authenticating, biometric fingerprint identification device having internal memory and internal controller, an encoded or encrypted information packet output, e.g., a digitized tonal output, and a unique transaction identifier, which are all provided in the present invention.

SUMMARY OF THE INVENTION

The present invention is directed to a biometric fingerprint device for self-authenticating identification of at least one user of the device including internal memory and controller means within a substrate of the device and encoded packet(s) of information output, e.g., a digitized tonal output, for communicating with a remote transaction facilitator.

Additionally, the present invention is directed to a biometric fingerprint device for self-authenticating identification of at least one user including a unique transaction identifier for increased security, particularly with retail transactions made via phone, wireless device, Internet, satellite, or other communication means.

Accordingly, one aspect of the present invention is to provide a biometric fingerprint device for self-authenticating identification of at least one user of the device including internal memory and controller means within a substrate of the device and an encoded or encrypted information packet output, e.g., a digitized tonal output, for communicating with a remote tone bank for validation therewith.

Another aspect of the present invention is to provide a biometric fingerprint device for self-authenticating identification of at least one user including a unique transaction identifier for increased security, particularly with retail transactions made via phone, wireless device, Internet, satellite, or other communication means.

These and other aspects of the present invention will become apparent to those skilled in the art after a reading of the following description of the preferred embodiment when considered with the drawings.

DETAILED DESCRIPTION OF THE PREFERRED EMBODIMENTS

According to the present invention, a biometric device is provided for self-authenticating identification of at least one user. Basic functions and configurations of the biometric device are set forth by U.S. Pat. No. 5,623,552 issued Apr. 22, 1997 to Lane for Self-authenticating identification card with fingerprint identification, which is invented by the identical inventor and owned by a common assignee and incorporated herein by reference in its entirety. The device includes a substrate having a fingerprint sensor, internal memory means for storing digitized information related to a fingerprint of the at least one user, activation means for initiating internal storage of the information related to at least one fingerprint corresponding to the at least one user upon activation by the at least one user for a first time thereby creating and recording at least one registered user, an internal controller, verification means for indicating that the information related to the at least one fingerprint corresponding to the at least one registered user has been successfully stored in the internal memory means, and authentication means for comparing information related to a sensed fingerprint corresponding to the at least one user that has been sensed with the stored fingerprint information of the registered user and for producing an authentication signal if the sensed fingerprint information matches the stored fingerprint information of the at least one registered user.

The fingerprint sensor is capable of sensing information related to at least one fingerprint and the sensed fingerprint is either used to register a new user, if multiple users are permitted for the particular device, or is used to verify that the information relating to the sensed fingerprint matches the information of the fingerprint of each of the registered users. In the case where more than one user may be registered for a device, each user has corresponding fingerprint identification information that is unique to that user and registered similarly.

The internal memory means is electrically connected to the fingerprint sensor, the verification means, the authentication means, and the activation means is electrically connected to the fingerprint sensor and the internal memory means. Also, the internal controller is capable of independently programming the internal memory means with the information related to a fingerprint corresponding to the at least one user by generating an internal control signal to initiate transfer of the information related to the sensed fingerprint corresponding to the at least one user to the internal memory means for storage therein. Additionally, the verification means and/or authentication means further includes a transmitter for indicating that the information related to a fingerprint has been successfully stored to create the at least one registered user. This verification and/or authentication signal includes an encoded or encrypted information packet output for verification and/or for authentication that the fingerprint matches that of the at least one registered user that is transmitted or communicated via an encoded information packet output transmitter located within the biometric device substrate. For example, in a preferred embodiment, the encoded information packet output includes a digitized tonal output for audible and/or inaudible transmission via a digitized tonal transmitter and detection by a remote transaction facilitator.

Additionally, a tone generator is capable of converting the digitized tonal representation and/or verification of the fingerprint into corresponding notes on a musical scale. Alternatively, the tone generator may produce either audible or inaudible tones and/or a combination of both audible and inaudible tones; the tones are converted into an encoded or encrypted information packet that is output by a transmitter located within the device.

According to a preferred embodiment of the present invention, the biometric device also includes encoding means electrically connected to the activation means and verification means for providing encrypted fingerprint information corresponding to the stored fingerprint information and the authentication signal.

Use of the biometric device according to a preferred embodiment of the present invention further includes a unique transaction identifier that is appended to the encoded or encrypted information packet, e.g., that is digitally appended to the digitized information related to a fingerprint of the at least one registered user, thereby preventing duplicate and unauthorized use of the device. This unique transaction identifier is attached to, connected or associated with, and/or integrated with the encoded information packet output, e.g., digitally appended to the digitized tonal output. The unique transaction identifier may advantageously be a predetermined digital value created relative to a tone bank or other transaction facilitator with which the user makes a transaction. The unique transaction identifier is provided by a unique transaction identifier generator that may either exist within the substrate or may be remotely located from the substrate. By way of example, the unique transaction identifier generator may be the controller that generates a random number.

According to one embodiment of the claimed invention, the unique transaction identifier may be a digitized date and time value, thereby ensuring only one unique transaction identifier corresponds with any given transaction. The date and time value associated with the unique transaction identifier is generated by a clock, preferably an atomic clock, for providing a single, unique date and time value, thereby preventing duplicate and unauthorized use of the device. Also preferably, the unique transaction identifier may include a date and time and spatial locator value for locating the user of the device and the location of the device making the transaction to identify a source of the transaction. The spatial locator value may be derived from communication with the global positioning satellite system (GPS) for determining a location on earth based on a locator signal sent by the GPS and the locator signal being received by the device and/or tonal bank or other transaction facilitator. Also, it is desirable that the device be capable of communicating with the GPS via a contact signal emitted by the device sent to the GPS for receipt and transmission to a tone bank and/or transaction facilitator. Also, the device transmits the locator signal to a remote transaction facilitator and/or tone bank for documentation of the location of the device with the time of the transaction. Additionally, a caller identification-based system can be used. Also, a random value may be generated internal to the device, e.g., by the controller, for use as a unique transaction identifier without requiring communication with an external apparatus or external unique transaction identifier generator.

Preferably, the unique transaction identifier is internally stored on the device substrate within the internal memory of the device and can be selectively and/or automatically deleted. More particularly, in a preferred embodiment of the present invention, the encoded information packet, which may include a digitized tonal representation of the fingerprint, is internally stored on the substrate.

Furthermore, the encoded and/or encrypted information packet preferably includes a digitized representation of the sensed and registered at least one fingerprint; information related to the verification of the digitized representation of the fingerprint, which is capable of including a digitized tonal representation of the fingerprint, is communicated to a remote transaction facilitator for conducting a transaction using the device upon verification and/or authentication internally to the device that the user is the at least one registered user. The biometric device also includes communication or transmission of the encoded and/or encrypted information packet including information of the fingerprint(s) of the user(s) via modern communication means selected from the group consisting of digital, wireless, optical, photonics, analog, microwave, laser, infrared, EMF signal, and similar transmission means, and combinations thereof and by modem communication devices selected from the group consisting of telephone, cable, wireless phone, handheld wireless devices, handheld computing devices, computers, satellite, fax, laser device, light modulator, and combinations thereof. Thus, the digitized tonal representation of the fingerprint is capable of being validated with a remote tone bank.

The transaction facilitator, which may communicate with a biometric device user is a potential source of revenue. For example, credit card use via telephone or Internet requires payment for processing. Typically, the card issuer and/or merchants are assessed a fee for each transaction or purchase and verification of credit card user. Similarly, for use of the present invention in connection with a transaction, the transaction facilitator would be required to pay a fee per transaction that is a function of or percentage of the transaction.

EXAMPLE

In this example of the preferred embodiment of the invention, the device has a fingerprint template, an amplifier, an output device, and a clock. The device clock and the tone bank clock are set to the same time. When the correct card user initiates a transaction by authenticating his/her fingerprint on the fingerprint template, the device emits from the output device a tone that is related to the time of the device clock. The device clock time is then compared to the tone bank clock time. The device clock time is programmable by the user to a desired time variance; by way of example, the user may program the device such that the device clock time cannot differ from the tone bank clock time by more than 4 minutes. If the times of the two clocks differ by more than 4 minutes, the transaction will not be accepted. Examples of acceptable and non-acceptable time differences are shown in Table 1, which follows.

TABLE 1

Time difference acceptability for a device according to the present invention when the tone clock time is 13:00:00.

| Device Clock Time | Time Difference Acceptability |
|---|---|
| 12:56:12 | Acceptable |
| 12:55:00 | Unacceptable |
| 13:04:00 | Acceptable |
| 13:05:23 | Unacceptable |

In this example, the correct card holder communicates with the tone bank at 12:56:00. The tone is illegally recorded by a third party for the purposes of making illegal transactions. The correct card holder stays on line for one minute. The third party then makes an illegal call at 12:57:00, after the correct card holder has terminated the call, and is accepted because the time transmitted is within 4 minutes of the tone bank clock time. However, after a call is 10 minutes long, the tone bank interrupts and requests a reconfirmation of the time. The third party cannot supply the accurate time, as the time tone that they possess by illegal recording is 12:56:00 and the tone bank time is 13:07:00, the difference of which is out of the range of acceptability and the call is terminated.

Certain modifications and improvements will occur to those skilled in the art upon a reading of the foregoing description. By way of example, the substrate may be substantially compact such that it can be used as or within a smart card, or credit card sized device, including a magnetic swipe to be loaded with or containing additional information about the registered user. Alternatively, the substrate may be a larger embodiment, e.g., a computer circuit board. All modifications and improvements have been deleted herein for the sake of conciseness and readability but are properly within the scope of the following claims.

I claim:

1. A method for using a transaction card including a biometric device for self-authenticating identification of at least one user to request authorization for a transaction from a transaction approval system comprising the steps of:

sensing information related to at least one fingerprint impressed upon a fingerprint sensor of a substrate;

independently generating at least one control signal internal to the substrate to transfer the sensed at least one fingerprint information internally from the fingerprint sensor to an internal substrate memory and electronically store the sensed fingerprint information within the internal substrate memory for at least one registered user;

producing an authentication including a verification signal indicating that the sensed fingerprint information has been successfully electronically stored in the internal substrate memory;

generating a transaction identifier including a date and time stamp on the transaction card;

generating an encoded tonal representation of the date and time stamp; and transmitting the tonal representation to a device in communication with the transaction approval system.

2. A system for authorizing a transaction comprising:

a biometric device for self-authenticating identification of at least one user including:
- a substrate having a fingerprint sensor;
- internal memory means for storing digitized information related to at least one fingerprint of the at least one user;
- activation means for initiating internal storage of the information related to the at least one fingerprint corresponding to the at least one user upon activation by the at least one user for a first time thereby creating and recording at least one registered user;
- an internal controller capable of independently programming the internal memory means with the information related to a fingerprint corresponding to the at least one user by generating an internal control signal to initiate transfer of the information related to the fingerprint corresponding to the at least one user to the internal memory means for storage therein;
- authentication means for comparing information related to a sensed fingerprint corresponding to the at least one user that has been sensed with the stored fingerprint information of the registered user and for producing an authentication including an authentication signal including an authentication date and time value corresponding to the authentication if the sensed fingerprint information matches the stored fingerprint information of the registered user;
- a device clock for providing a time and date value corresponding to the authentication;
- verification means for indicating that the information related to the at least one fingerprint corresponding to the at least one registered user has been successfully stored in the internal memory means; and
- programming means for permitting the user to enter a maximum time variance value;

an approval system for approving a transaction including a system clock for providing a system date and time value; and comparing means for comparing the date and time value corresponding to the authentication with the system date and time value and determining whether a difference between the authentication date and time value corresponding to the authentication and the system date and time value is greater than the maximum time variance value.

3. A method of approving a transaction using a transaction card comprising:
- sensing information related to a fingerprint impressed upon a fingerprint sensor of a card substrate;
- generating a control signal internal to the substrate;
- transferring the sensed fingerprint information from the fingerprint sensor to a substrate memory;
- storing the sensed fingerprint information within the internal substrate memory;
- producing an authentication including a verification signal indicating that the sensed fingerprint information has been successfully stored in the internal substrate memory;
- generating a transaction identifier including a date and time stamp related to the authentication;
- converting the transaction identifier including the date and time stamp into an tone;
- transmitting the tone into a microphone in communication with a transaction approval system;
- converting the audible tone into the transaction identifier;
- comparing the date and time stamp to an approval center date and time;
- determining the difference between the date and time stamp and the approval center date and time;
- receiving a maximum time variance value input from a card user;
- denying approval of the transaction if the difference between the date and time stamp of the transaction identifier and the approval center date and time is greater than the maximum time variance value; and
- approving the transaction if the difference between the date and time stamp of the transaction identifier and the approval center date and time is smaller than the maximum time variance value.

4. A system for authorizing a transaction comprising:

a biometric device for self-authenticating identification of at least one user including:
- a substrate having a fingerprint sensor;
- internal memory means for storing digitized information related to at least one fingerprint of the at least one user;
- activation means for initiating internal storage of the information related to the at least one fingerprint corresponding to the at least one user upon activation by the at least one user for a first time thereby creating and recording at least one registered user;
- an internal controller capable of independently programming the internal memory means with the information related to a fingerprint corresponding to the at least one user by generating an internal control signal to initiate transfer of the information related to the fingerprint corresponding to the at least one user to the internal memory means for storage therein;
- authentication means for comparing information related to a sensed fingerprint corresponding to the at least one user that has been sensed with the stored fingerprint information of the registered user and for producing an authentication including an authentication signal including an authentication date and time value corresponding to the authentication if the sensed fingerprint information matches the stored fingerprint information of the registered user;
- a device clock for providing time and date value corresponding to the authentication;
- a unique transaction identifier generator for converting the date and time value to an encoded representation of the date and time value;
- verification means comprising a speaker for audibly transmitting the tonal representation for indicating that the information related to the at least one fingerprint corresponding to the at least one registered user has been successfully stored in the internal memory means.

* * * * *